United States Patent [19]

Logtenberg et al.

[11] Patent Number: 4,987,641
[45] Date of Patent: Jan. 29, 1991

[54] DEVICE FOR STICKING SLAUGHTER ANIMALS

[75] Inventors: Harry Logtenberg, Bilthoven; Henk Jansen, Zeist, both of Netherlands

[73] Assignee: Nederlandse Organisatie voor toegepastnatuurwetenschappelijk Onderzoek TNO, Netherlands

[21] Appl. No.: 525,494

[22] Filed: May 17, 1990

[30] Foreign Application Priority Data

May 19, 1989 [NL] Netherlands .......................... 8901268

[51] Int. Cl.$^5$ .............................................. A22B 5/04
[52] U.S. Cl. ..................................................... 452/65
[58] Field of Search ..................... 17/1 R, 1 C, 52, 57, 17/45

[56] References Cited

U.S. PATENT DOCUMENTS

| | | | |
|---|---|---|---|
| 2,616,123 | 11/1952 | Armstrong | 17/1 R |
| 3,649,996 | 3/1972 | Marti | 17/1 C |
| 4,270,241 | 6/1981 | Braga | 17/1 C |
| 4,716,625 | 1/1988 | Nijhuis | 17/45 |
| 4,774,741 | 10/1988 | Bernharapt et al. | 17/51 |

FOREIGN PATENT DOCUMENTS

| | | |
|---|---|---|
| 112264 | 6/1984 | European Pat. Off. . |
| 3133990 | 3/1983 | Fed. Rep. of Germany . |
| 3133991 | 3/1983 | Fed. Rep. of Germany . |
| 8501798 | 1/1987 | Netherlands . |
| 2083995 | 4/1982 | United Kingdom . |

Primary Examiner—Willis Little
Attorney, Agent, or Firm—Ostrolenk, Faber, Gerb & Soffen

[57] ABSTRACT

A device for severing the carotid artery of a slaughter animal, in particular a pig, with a pointed object or a knife, comprising a knife guide carried by a movable support, wherein the support to be moved along the breast side of the slaughter animal bears a scanning element for detecting a part of the body which is in a known spatial relationship with the place where the carotid artery must be severed. Said part of the body is preferably formed by the transition from the breast bone to the neck. Advantageously, the support comprises a plate with two sliding ribs. The scanning element may be formed by a spring-supported running wheel which can be moved at right angles to the plane through the sliding ribs.

7 Claims, 1 Drawing Sheet

DEVICE FOR STICKING SLAUGHTER ANIMALS

BACKGROUND OF THE INVENTION

The invention relates to a device for severing the carotid artery of a slaughter animal, with a pointed object or a knife, comprising a knife guide carried by a movable support.

DISCUSSION OF THE PRIOR ART

Severing the carotid artery with a knife has to take place at a very specific point, in such a way that the slaughter animal quickly bleeds dry through the opening produced. It must also be ensured that no undesirable wounds, for example shoulder wounds occur in the slaughter animal during sticking.

Since slaughter animals will always differ from one another to a greater or lesser extent in terms of body build, the physical features of the individual slaughter animal have to be taken into account in a sticking device in order to ensure that the desired sticking is carried out at the correct point.

A device for sticking pigs is described in European Patent Specification No. 0 112 264. In this device a pig is clamped standing on a tilting platform by means of braces, and is then stunned. After the thus fixed pig is turned head downwards, the carotid artery is severed by moving a knife in a knife guide which is fixed on a support sliding at the belly side of the pig.

This sticking device comprises no means for adjusting the stick as regards sticking angle and sticking point to the individual physical features of the slaughter animals, inevitably meaning that relatively many bad sticks will be made, i.e. sticks where the carotid artery is only partially touched, or is not touched at all. The slaughter animal consequently bleeds too slowly and/or does not bleed completely dry.

SUMMARY OF THE INVENTION

The object of the invention is to provide a device in which the correct sticking point is determined for each animal individually.

This object is attained according to the invention in that the support to be moved along the breast side of the slaughter animal bears a scanning element for detecting a part of the body which is in a known spatial relationship with the place where the carotid artery must be severed.

With the device according to the invention, the place of a particular part of the body is sought for each slaughter animal, said place being in a known spatial relationship with the place where the carotid artery has to be severed, by moving a support over the breast in the direction from the belly towards the neck. The part of the body sought is preferably the transition from the breast bone to the neck. The locating operation is carried out by a scanning element, preferably a spring-supported running wheel.

The claims and advantages will be more readily appreciated as the same becomes better understood by reference to the following detailed description and considered in connection with the accompanying drawings in which like reference symbols designate like parts in the figures.

DESCRIPTION OF THE DRAWINGS

FIG. 2 shows a perspective view of a pig, on the breast of which the device of FIG. 1 is placed.

DESCRIPTION OF THE PREFERRED EMBODIMENT

Figure 1:
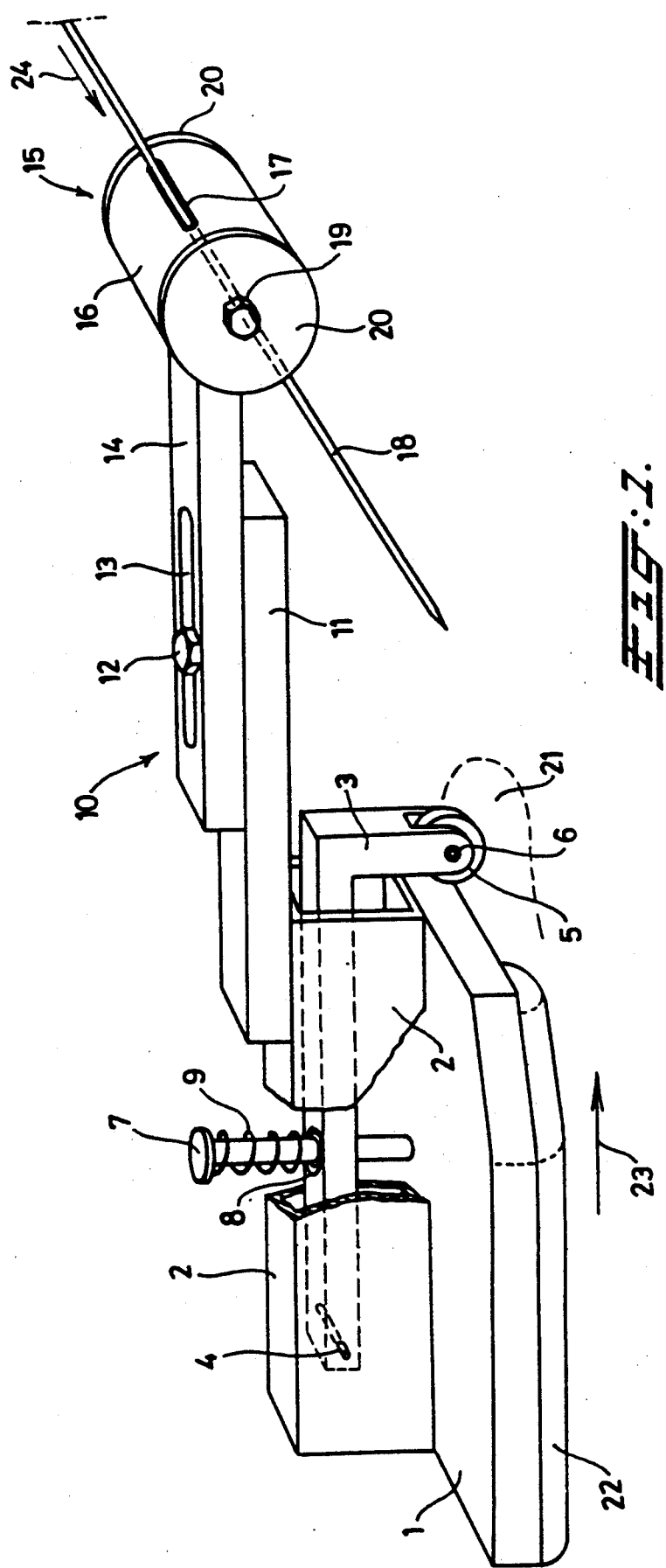
FIG. 1 shows a perspective view of a preferred embodiment of the device according to the invention.

FIG. 1 shows a plate 1, on which is fixed a tube 2 of rectangular cross-section, which is shown partially cut away. An arm 3 is mounted in the tube 2 in such a way that it can rotate about an axis 4, so that the arm 3 can tilt through a limited angle. A running wheel 5 is fixed at a forked end of the arm 3, in such a way that it can rotate about an axis 6.

The plate 1 also has fixed on it a pin 7 which is provided with a head and runs through a slot-shaped hole 8 in the arm 3. The slotted hole 8 constitutes no hindrance to the tilting movement of the arm 3. A compression spring 9 which exerts a force on the arm 3 in the direction of the plate 1 is confined between the head of the pin 7 and the arm 3. The tube 2 is provided with a suitable aperture (not shown) which forms a hindrance-free passage for the pin 7 with the compression spring 9.

Fixed on the tube 2 is a second arm 10 which is adjustable in length, and comprises a bar 11 in which a bolt 12 is fitted and a second bar 14 provided with a slot 13. The bar 14 can be slid relative to the bar 11 over a distance determined by the length of the slot 13 and can be clamped by means of the bolt 12 on the bar 11.

Fixed at the end of the arm 10 facing away from the arm 3 is a knife guide 15, comprising a cylinder 16 in which a guide slit 17 for a knife 18, which in the present case is flat, is provided. The cylinder 16 can be clamped, by means of two bolts 19 provided in it between two flanges 20 which are fixed to the bar 14. After loosening of the bolts 19, the cylinder 16 can be turned relative to the arm 10 into a desired angular position which can be fixed by tightening the bolts 19.

Prior to severing of the carotid artery of a slaughter animal, the whole unit is slid over its breast at the breast bone 21 by means of two sliding ribs 22 fitted below the plate 1. Arrow 23 indicates the sliding direction which goes on the slaughter animal from the belly to the neck. In the sliding movement, thanks to the working of compression spring 9, the running wheel 5 follows the contour of the schematically shown breast bone 21. After passing of the end of the breast bone 21, the arm 3 will move under the action of the spring 9 in the transition from the relatively hard, unyielding breast bone 21 to the relatively soft, yielding neck of the slaughter animal to the outermost position, i.e. against the bottom side of tube 2. In this way a reference point is found, following which the knife 18 is pressed in the direction of the arrow 24 through the knife guide 15 for severing in the correct place the carotid artery (not shown) of the slaughter animal, so that the slaughter animal bleeds dry.

The correct sticking point and direction for the knife 18 are predetermined, and are set by a correct setting of the relative position of the bars 11 and 14 and that of the flanges 20 and the cylinder 16.

It will be clear that the embodiment described is suitable for severing the carotid artery manually, but that it is also possible to mechanize the sticking operation with the device according to the invention. The knife 18 can in this case be moved in the knife guide 15 by various drive means which are obvious to the expert. The plate 1 can also be moved over the breast bone 21 on the sliding ribs 22 with similar drive means. The arm 3 can in this case be coupled to a signal emitter which controls the movements of the knife 18 in i he direction 24 or in the opposite direction, and the plate 1 in the direction 23 or in the opposite direction.

FIG. 2 shows by way of example a pig from which the front left leg has been partially removed for the sake of clarity, in order to illustrate the positioning of the device according to the invention on the breast of a slaughter animal.

For correct operation of the device according to the invention, it is important that the slaughter animal should be properly stunned prior to the sticking operation, since spasms and other undesirable muscle contractions occur in the case of poor stunning, which makes the transition from the breast bone to the neck less easy to establish.

What is claimed is:

1. A device for severing the carotid artery of a slaughtered animal, in particular a pig, with a pointed object or a knife, comprising: a support movable along the breast side of the slaughtered animal, a knife guide carried by said movable support, a knife means displaceable in said knife guide, and a scanning element carried by said movable support for detecting a part of the body which is in a known spatial relationship with the place where the carotid artery must be severed.

2. A device according to claim 1, wherein said part of the body is formed by the transition from the breast bone to the neck.

3. A device according to claim 1, wherein the support comprises a plate with two sliding ribs.

4. A device according to claim 1, wherein in that the scanning element is formed by a spring-supported running wheel which can be moved at right angles to the plane through the sliding ribs.

5. A device according to any of the preceding claims, wherein the knife guide is connected to the support by means of an arm which is adjustable in length.

6. A device according to claim 1, wherein the knife guide is formed by a cylinder accommodated between two flanges and provided with a guide slit.

7. A device according to claim 2, wherein the support comprises a plate with two sliding ribs.

* * * * *